United States Patent
Huang-Fu (10) Patent No.: US 11,503,667 B2
(45) Date of Patent: Nov. 15, 2022

(54) ENHANCEMENT FOR MULTI-ACCESS PDU SESSION RELEASE

(71) Applicant: MEDIATEK INC., Hsin-Chu (TW)

(72) Inventor: Chien-Chun Huang-Fu, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 79 days.

(21) Appl. No.: 17/013,717

(22) Filed: Sep. 7, 2020

(65) Prior Publication Data
US 2021/0105858 A1    Apr. 8, 2021

Related U.S. Application Data

(60) Provisional application No. 62/912,123, filed on Oct. 8, 2019.

(51) Int. Cl.
*H04W 76/34* (2018.01)
*H04W 76/15* (2018.01)
*H04W 88/06* (2009.01)

(52) U.S. Cl.
CPC ........... *H04W 76/34* (2018.02); *H04W 76/15* (2018.02); *H04W 88/06* (2013.01)

(58) Field of Classification Search
CPC ..... H04W 76/34; H04W 76/15; H04W 88/06; H04W 76/16; H04W 74/02; H04W 36/08; H04W 74/0833; H04W 76/30
See application file for complete search history.

(56) References Cited

U.S. PATENT DOCUMENTS

| | | | |
|---|---|---|---|
| 2019/0261449 A1 | 8/2019 | Kim et al. | H04W 80/02 |
| 2020/0196375 A1* | 6/2020 | Ryu | H04W 76/34 |
| 2020/0221527 A1* | 7/2020 | Bharatia | H04W 8/02 |
| 2020/0305118 A1* | 9/2020 | Ryu | H04W 76/10 |
| 2020/0413241 A1* | 12/2020 | Park | H04W 76/22 |
| 2021/0084569 A1* | 3/2021 | Kim | H04W 48/08 |
| 2021/0136854 A1* | 5/2021 | Kuge | H04W 88/14 |

(Continued)

FOREIGN PATENT DOCUMENTS

WO    WO 2019160278 A1    2/2018

OTHER PUBLICATIONS

China IPO, office action for the Chinese patent application 202011053577.0 (no English translation is available), dated Aug. 22, 2022 (8 pages).

*Primary Examiner* — Will W Lin
(74) *Attorney, Agent, or Firm* — Imperium Patent Works; Zheng Jin (57) ABSTRACT

A method for handling multi-access (MA) Protocol data unit (PDU) session release is proposed. An MA PDU session uses one 3GPP access network or one non-3GPP access network at a time, or simultaneously one 3GPP access network and one non-3GPP access network. Upon receiving a PDU session release command message including an access type, the user equipment (UE) transmits a PDU session release complete message or a 5G session management (5GSM) status message to the 5G system (5GS). In addition, the UE determines the user plane resources of the MA PDU session on the access indicated in the access type as released, or determines the MA PDU session as released, depending on the access indicated in the access type and the access(es) over which the user plane resources of the MA PDU session are established.

20 Claims, 9 Drawing Sheets

(56) References Cited

U.S. PATENT DOCUMENTS

| | | | |
|---|---|---|---|
| 2021/0212021 A1* | 7/2021 | Youn | H04W 60/00 |
| 2021/0227596 A1* | 7/2021 | Aramoto | H04W 76/18 |
| 2021/0281993 A1* | 9/2021 | Tiwari | H04W 4/90 |
| 2022/0007444 A1* | 1/2022 | Kawasaki | H04W 76/34 |
| 2022/0015174 A1* | 1/2022 | Aramoto | H04W 76/15 |

* cited by examiner

ENHANCEMENT FOR MULTI-ACCESS PDU SESSION RELEASE

CROSS REFERENCE TO RELATED APPLICATIONS

This application claims priority under 35 U.S.C. § 119 from U.S. Provisional Application No. 62/912,123, entitled "Enhancement of MA PDU session release", filed on Oct. 8, 2019, the subject matter of which is incorporated herein by reference.

TECHNICAL FIELD

The disclosed embodiments relate generally to wireless communication, and, more particularly, to method for handling multi-access (MA) PDU session release.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In 5G/NR, a protocol data unit (PDU) session defines the association between the SE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G access network (e.g., 3GPP radio access network (RAN), or via a non-3GPP RAN). The network/UE can initiate different PDU session procedures, e.g., PDU session establishment, PDU session modification, and PDU session release, for managing PDU sessions.

Operators are seeking ways to balance data traffic between mobile networks and non-3GPP access in a way that is transparent to users and reduces mobile network congestion. In 5GS, UEs can be simultaneously connected to both 3GPP access and non-3GPP access (using 3GPP NAS signaling), thus the 5GS is able to take advantage of these multiple accesses to improve the user experience and optimize the traffic distribution across various accesses. Accordingly, 3GPP introduced. Multi-Access (MA) PDU session in 5GS. An MA PDU session can be configured to use one 3GPP access network or one non-3GPP access network at a time, or simultaneously one 3GPP access network and one non-3GPP access network. The 5GS can initiate a PDU session release procedure to release one specific access type or both access types for an MA PDU session.

However, UE behavior is undefined on how to handle the MA PDU session when the access type indicated in the PDU session release command is not included in the MA PDU session or when the access type indicated in the PDU session release command is the only one access type included in the MA PDU session. In addition, UE behavior is undefined on how to handle the PDU session when the PDU session is a single-access PDU session and a PDU session release command indicating a specific access type is received.

A solution is sought.

SUMMARY

A method for handling multi-access (MA) Protocol data unit (PDU) session release is proposed. An MA PDU session uses one 3GPP access network or one non-3GPP access network at a time, or simultaneously one 3GPP access network and one non-3GPP access network. On the other hand, a single-access PDU session uses either one 3GPP access network or one non-3GPP access network at a time. In response to receiving a PDU session release command message comprising an access type indicating a first radio access technology (RAT) access (e.g., 3GPP access or non-3GPP access), the UE transmits a PDU session release complete message or a 5G session management (5GSM) status message to the 5GS.

In one embodiment, if the established PDU session is an MA PDU session having user plane resources established on only the first RAT access indicated in the access type, the UE may consider/determine the MA PDU session as released or keep the MA PDU session as it is. In one example, by considering/determining the MA PDU session as released, the UE may release the MA PDU session, and enter PDU SESSION INACTIVE state.

In another embodiment, if the established PDU session is an MA PDU session having user plane resources established on only a second RAT access different from the first RAT access indicated in the access type or on both the first RAT access and the second RAT access, the UE may consider/determine the user plane resources of the MA PDU session on the first RAT access indicated in the access type as released or keep the MA PDU session as it is. In one example, by considering/determining the user plane resources of the MA PDU session on the first RAT access indicated in the access type as released, the UE may stay in PDU SESSION ACTIVE state.

In yet another embodiment, the 5GSM status message may comprise a cause value indicating that the PDU session release command message is not valid for the established PDU session.

In yet another embodiment, if the established PDU session is not an MA PDU session, the UE may release the PDU session or keep the PDU session as it is.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
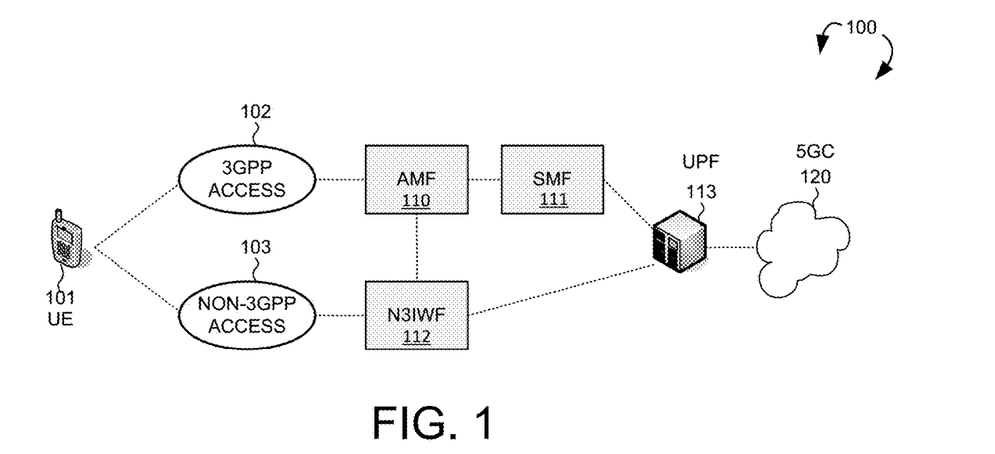
FIG. 1 illustrates an exemplary 5G network 100 supporting multi-access (MA) protocol data unit (PDU) session management in accordance with one novel aspect.

FIG. 1 illustrates an exemplary 5G network 100 supporting multi-access (MA) protocol data unit (PDU) session management in accordance with one novel aspect. 5G new radio (NR) network 100 includes a user equipment (UE) 101, a 3GPP access 102 (e.g., a 3GPP radio access network (RAN)), a non-3GPP access 103 (e.g., a non-3GPP RAN), an access and mobility management function (AMF) 110, a session management function (SMF) 111, an Non-3GPP interworking function (N3IWF) 112, a user plane function (UPF) 113, and a 5G core (5GC) data network 120. The AMF 110 communicates with the base stations in the 3GPP access 102, the SMF 111, and the UPF 113 for access and mobility management of wireless access devices in a mobile communication network (e.g., the 5G network 100). The SMF 111 is primarily responsible for interacting with the decoupled data plane, creating, updating and removing PDU sessions and managing session context with the UPF 113.

The N3IWF 112 interfaces to 5G core network control plane functions, responsible for routing messages outside 5G RAN.

In Access Stratum (AS) layer, an RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs) providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. The UE 101 may be a smart phone, a wearable device, an Internet of Things (IoT) device, a tablet, etc. 5GS networks are packet-switched (PS) Internet Protocol (IP) networks. This means that 5GS networks deliver all data traffic in IP packets, and provide users with Always-On IP Connectivity. When a UE joins an evolved packet system (EPS) network, a Packet Data Network (PDN) address (i.e., the one that can be used on PDN) is assigned to the UE for its connection to the PDN. In 4G, has defined a Default EPS Bearer to provide the IT Connectivity that is Always-On. In 5G, a PDU session establishment procedure is a parallel procedure of a PDN connection procedure in 4G. A PDU session defines the association between the UE and the data network that provides a PDU connectivity service. Each PDU session is identified by a POD session ID, and may include multiple QoS flows and QoS rules. In 5G network, QoS flow is the finest granularity for QoS management to enable more QoS control. The concept of QoS flow in 5G is like EPS bearer in 4G.

Each PDU session can be established over a 3GPP RAN, or over a non-3GPP RAN for radio access. 5G session management (5GSM) for PDU sessions over both 3GPP access and non-3GPP access are managed by AMF and SMF via NAS signaling. Operators are seeking ways to balance data traffic between mobile networks and non-3GPP access in a way that, is transparent to users and reduces mobile network congestion. In 5GS, UEs that can be simultaneously connected to both 3GPP access and non-3GPP access (using 3GPP NAS signaling), thus the 5GS is dole to take advantage of these multiple accesses to improves the user experience, and optimize the traffic distribution across various accesses. Accordingly, 3GPP introduced MA PDU sessions in 5GS. An MA PDU session uses one 3GPP access network or one non-3GPP access network at a time, or simultaneously one 3GPP access network and one non-3GPP access network.

For an established MA PDU session, 5GS can initiate a PDU session release procedure to release one specific access type or both access types for the MA PDU session. However, in certain situations, UE and 5GS may not be synchronized regarding the access type(s) over which an MA PDU session is established. For example, 5GS may initiate a PDU session release procedure to release a specific access type of an MA PDU session, when the MA PDU session is established over another access type or over only the indicated access type, or when UE has only a single-access PDU session.

In accordance with one novel aspect, explicit UE behaviors are proposed to handle the problems caused by unsynchronization between UE and 5GS. Specifically, upon reception of a PDU session release command message including an access type indicating a first RAT access of a PDU session, the UE 101 transmits a PDU session release complete message or a 5G 5GSM status message to the 5GS. In addition, if the PDU session is an MA PDU session having user plane resources established on only the first RAT access indicated in the access type, the UE 101 also considers/determines the MA PDU session as released or keeps the MA PDU session as it is. In one example, by considering/determining the MA PDU session as released, the UE 101 releases the MA PDU session, and deletes the PDU session contexts associated with the MA PDU session. If the PDU session is an MA PDU session having user plane resources established on only a second RAT access different from the first RAT access indicated in the access type or on both the first RAT access and the second RAT access, the UE 101 also considers/determines the user plane resources of the MA PDU session on the first RAT access indicated in the access type as released, or keeps the MA PDU session as it is. In one example, by considering/determining the user plane resources of the MA PDU session on the first RAT access indicated in the access type as released, the UE 101 stays in PDU SESSION ACTIVE state, keeps the PDU session contexts associated with the MA PDU session, and releases the user plane resources of the MA PDU session on the first RAT access if the MA PDU session has user plane resources established on both the first RAT access and the second RAT access.

On the other hand, if the PDU session is not an MA PDU session, the UE 101 also releases the PDU session or keeps the PDU session as it is.

Figure 2:
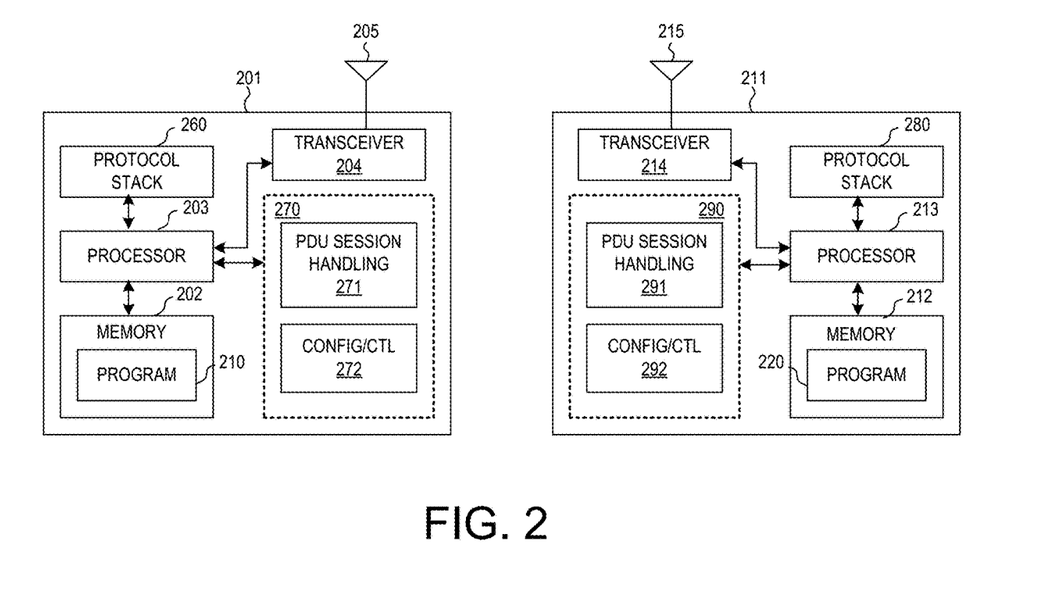
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes PDU session handling circuit 291 that handles PDU establishment, modification, and release procedures, and configuration and control circuit 292 that provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by software, firmware, hardware, and/or combination thereof. The control function modules and circuits, when executed by the processors via program instructions contained in the memory, interwork with each other to allow UE 201 to perform embodiments and functional tasks and features in the network.

In one example, control function modules and circuits 270 includes a PDU session handling circuit 271 that performs PDU session establishment, modification, and release procedures with the network, and a config and control circuit 272 that handles configuration and control parameters for mobility management and session management.

Figure 3:
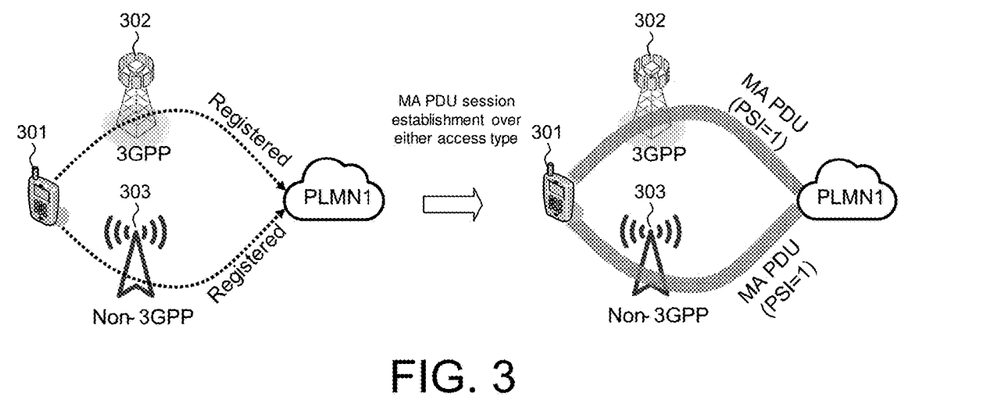
FIG. 3 illustrates one embodiment of establishing an MA PDU session in 5GS after a UE is registered to the network over both 3GPP and non-3GPP access type belonging to the same PLMN.

FIG. 3 illustrates one embodiment of establishing an MA PDU session in 5GS after a UE is registered to the network over both 3GPP and non-3GPP access type belonging to the same PLMN. UE 301 is registered over 3GPP access type to PLMN1 through a 3GPP base station gNB 302. UE 301 is also registered over non-3GPP access type to PLMN1 through a non-3GPP access point AP 303. UE 301 establishes an MA PDU session by initiating a PDU session establishment procedure with the network over either 3GPP or non-3GPP access type. The activation of the MA PDU connectivity service refers to the establishment of user-plane resources on both 3GPP access and non-3GPP access. Since UE 301 is registered to the network over both RAT access types belonging to the same PLMN1, the MA PDU session with PSI=1 is established over both 3GPP and non-3GPP access types, and then the user-plane resources are established over both 3GPP and non-3GPP access types.

Figure 4:
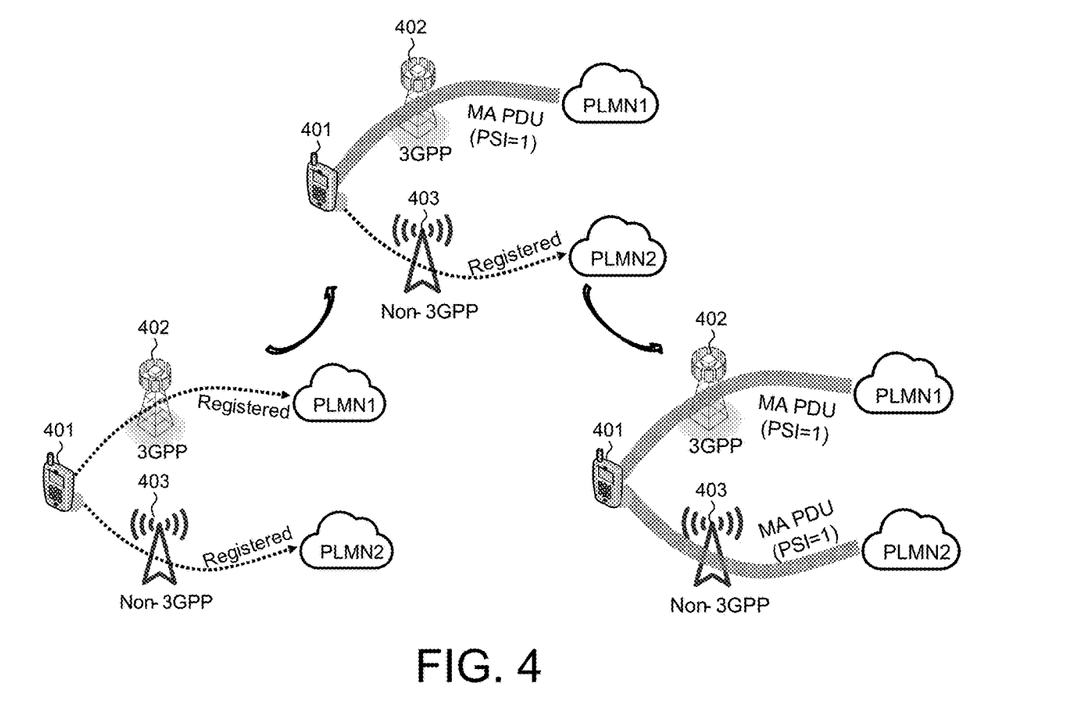
FIG. 4 illustrates one embodiment of establishing an MA PDU session in 5GS after a UE is registered to the network over both 3GPP and non-3GPP access type belonging to different PLMNs.

FIG. 4 illustrates one embodiment of establishing an MA PDU session in 5GS after a UE is registered to the network over both 3GPP and non-3GPP access type belonging to different PLMNs. UE 401 is registered over 3GPP access type to a first PLMN1 through a 3GPP base station gNB 402. UE 401 is also registered over non-3GPP access type to a second PLMN2 through a non-3GPP access point AP 403. UE 401 establishes an MA PDU session by initiating a PDU session establishment procedure with the network over one of the access types, e.g., 3GPP access type. For example, UE 401 sends a PDU SESSION ESTABLISHMENT REQUEST message to gNB 402, with a request type IE set to "MA PDU request" and with PSI=1. The user plane resource on 3GPP access is then established. Next, UE 401 sends another PDU SESSION ESTABLISHMENT REQUEST message to AP 403, with a request type IE set to "MA PDU request" and with the same PSI=1. The user plane resource on non-3GPP access may then be established. Since UE 401 is registered to the network over both RAT access types belonging to different PLMNs, the MA PDU session with PSI=1 is first established over 3GPP access type and then established over non-3GPP access type in two separate steps.

Figure 5:
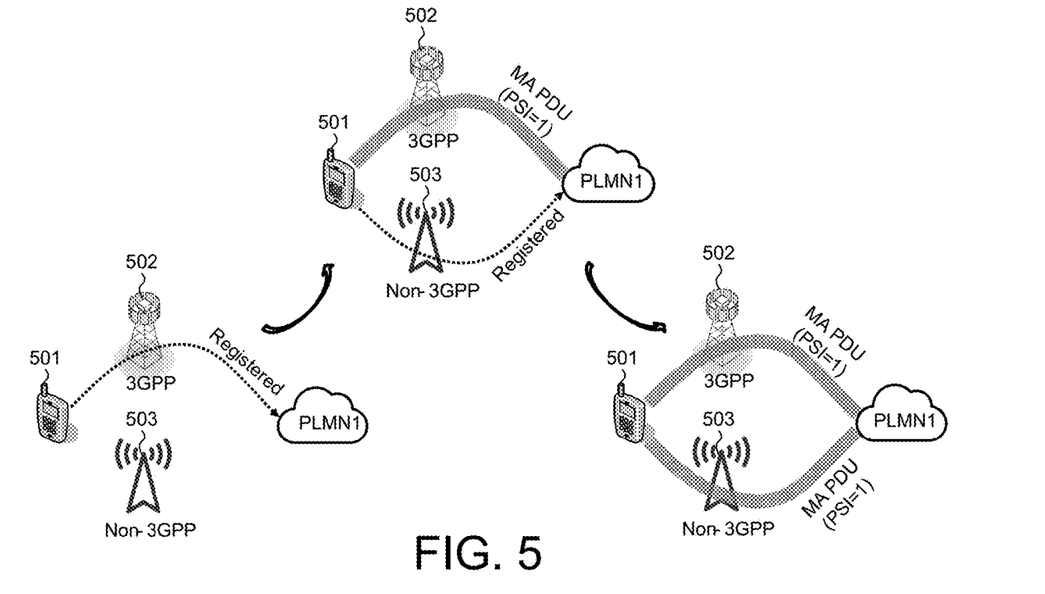
FIG. 5 illustrates another embodiment of establishing an MA PDU session in 5GS when a UE is registered to one RAT access type and then registered to another RAT access type to the same PLMN.

FIG. 5 illustrates another embodiment of establishing an MA PDU session in 5GS when a UE is registered to one RAT access type and then registered to another RAT access type to the same PLMN. UE 501 is registered over 3GPP access type to a first PLMN1 through a 3GPP base station gNB 502. UE 501 is not registered over non-3GPP access type to PLMN1. UE 501 then establishes an MA PDU session by initiating a PDU session establishment procedure with the network over 3GPP access type. For example, UE 501 sends a PDU SESSION ESTABLISHMENT REQUEST message to gNB 502, with a request type IE set to "MA PDU request" and with PSI=1. The user plane resource on 3GPP access is then established. Later, UE 501 is registered over non-3GPP access type to the same PLMN1 through a non-3GPP access point AP 503. UE 501 sends another PDU SESSION ESTABLISHMENT REQUEST message to AP 503, with a request type IE set to "MA PDU request" and with the same PSI=1. The user plane resource on non-3GPP access is then established. As a result, UE 501 establishes the MA PDU session to the same PLMN1 with PSI=1 over both 3GPP access type and non-3GPP access type in two separate steps.

Figure 6:
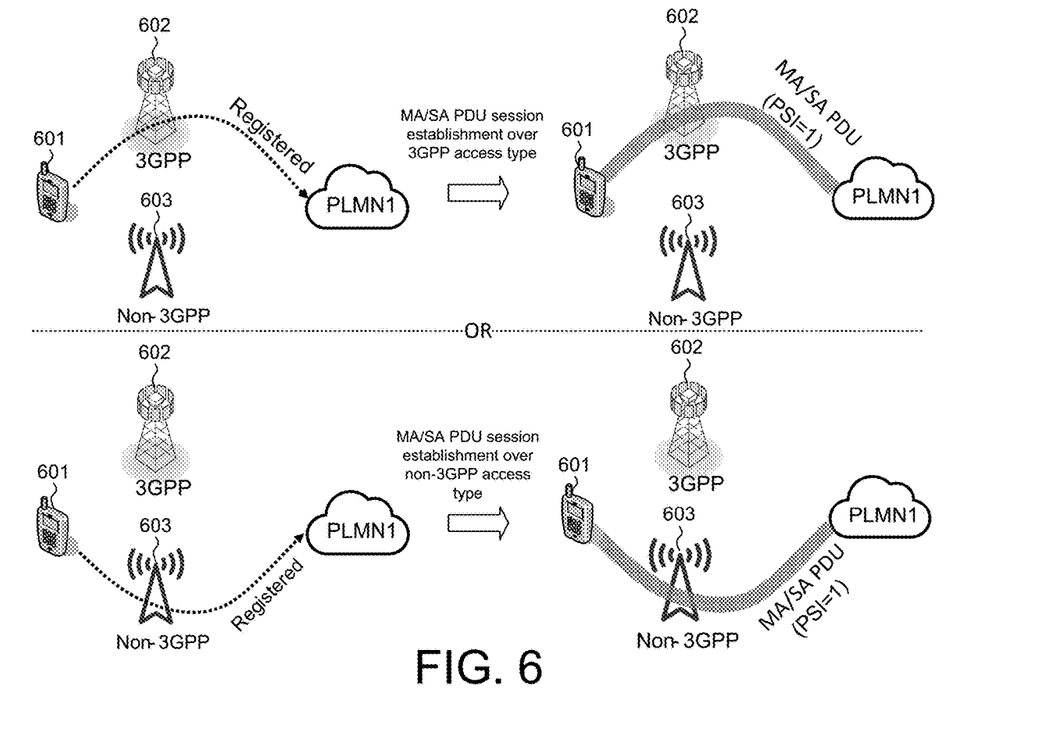
FIG. 6 illustrates one embodiment of establishing a single-access (SA) or MA PDU session in 5GS after a UE is registered to the network over either 3GPP or non-3GPP access type.

FIG. 6 illustrates one embodiment of establishing a single-access (SA) or MA PDU session in 5GS after a UE is registered to the network over either 3GPP or non-3GPP access type. UE 601 is registered over 3GPP access type to PLMN1 through a 3GPP base station gNB 602, or UE 601 is registered over non-3GPP access type to PLMN1 through a non-3GPP access point AP 603. UE 601 may establish a single-access PDU session by initiating a PDU session establishment procedure with the network over either 3GPP or non-3GPP access type. For example, UE 601 may send a PDU SESSION ESTABLISHMENT REQUEST message to gNB 602 or AP 603, with a request type IE set to "initial request" and with PSI=1. Alternatively, UE 601 may establish an MA PDU session by initiating a PDU session establishment procedure with the network over either 3GPP or non-3GPP access type. For example, UE 601 may send a PDU SESSION ESTABLISHMENT REQUEST message to gNB 602 or AP 603, with a request type IE set to "MA PDU request" and with PSI=1. As a result, the SA/MA PDU session with PSI=1 is established over either 3GPP or non-3GPP access type, and then the user-plane resource is established over either 3GPP or non-3GPP access type.

Figure 7:
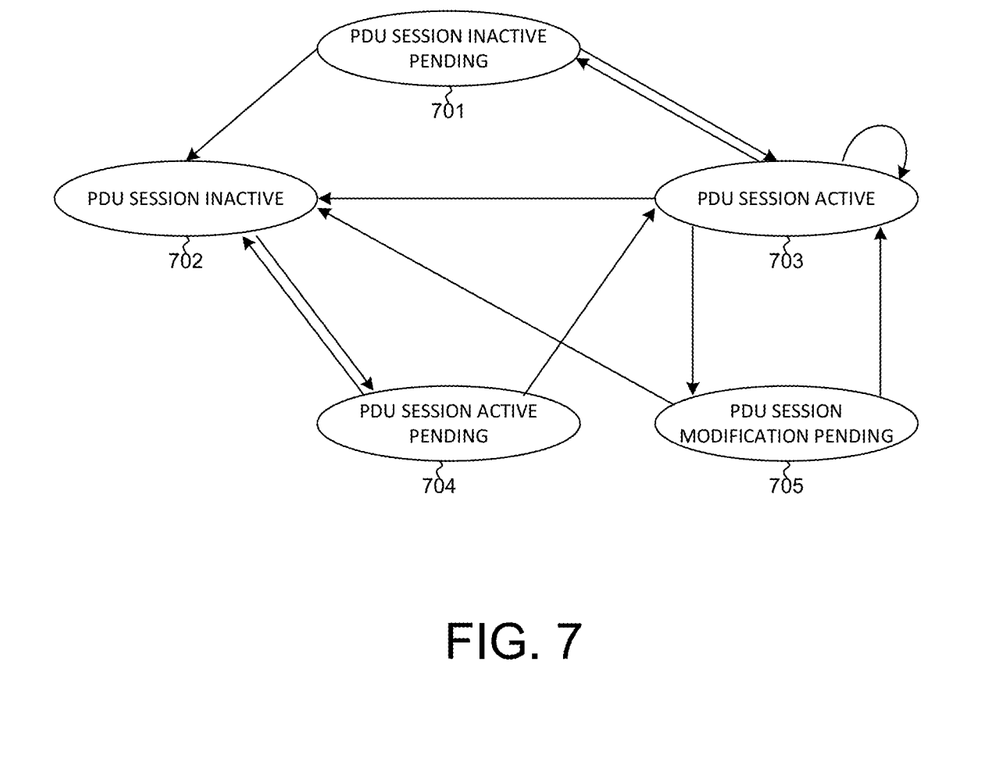
FIG. 7 illustrates a simplified state machine with possible 5GSM sublayer states of a UE for handling MA PDU session release in accordance with embodiments of the current invention.

FIG. 7 illustrates a simplified state machine with possible 5GSM sublayer states of a UE for handling MA PDU session release in accordance with embodiments of the current invention. For each PDU session, a UE can be in many different 5GSM states at different stages of the PDU session establishment, modification, and release procedures. From PDU SESSION INACTIVE PENDING state (701), UE can go to PDU SESSION INACTIVE state (702) if UE receives a PDU SESSION RELEASE COMMAND message, or UE can go to PDU SESSION ACTIVE state (703) if UE receives a PDU SESSION RELEASE REJECT message. From PDU SESSION INACTIVE state (702), UE can go to PDU SESSION ACTIVE PENDING state (704) when UE sends out a PDU SESSION ESTABLISHMENT REQUEST message. From PDU SESSION ACTIVE PENDING state (704), UE can go to PDU SESSION INACTIVE state if UE receives a PDU SESSION ESTABLISHMENT REJECT message, or UE can go to PDU SESSION ACTIVE state (703) if UE receives PDU SESSION ESTABLISHMENT ACCEPT message.

From PDU SESSION ACTIVE state (703), UE can possibly go to other three states or remain in active state. For example, UE can go to PDU SESSION MODIFICATION PENDING state (705) when UE sends out a PDU SESSION MODIFICATION REQUEST message. From PDU SESSION MODIFICATION PENDING state (705), UE can go to PDU SESSION INACTIVE state (702) if UE receives a PDU SESSION MODIFICATION REJECT message, UE can go to PDU SESSION ACTIVE state (703) if UE receives a PDU SESSION MODIFICATION COMMAND message or a PDU SESSION MODIFICATION REJECT message. Alternatively, UE can go to PDU SESSION INACTIVE state (702) or stay in PDU SESSION ACTIVE state (703) when UE receives a PDU SESSION RELEASE COMMAND message.

Note that this state machine does not illustrate all possible 5GSM states and associated state transactions for PDU session handling. However, the state machine defines some of the UE behaviors when UE is in certain 5GSM states and receives or sends certain 5GSM messages. For example, if UE is in PDU SESSION ACTIVE state (703) with a PDU session being an MA PDU session, and UE receives a PDU SESSION RELEASE COMMAND message for releasing a certain access type of the MA PDU session, UE can respond to the network with a PDU SESSION RELEASE COMPLETE message or a 5GSM STATUS message, and go to inactive state or remains in its current state.

Figure 8:
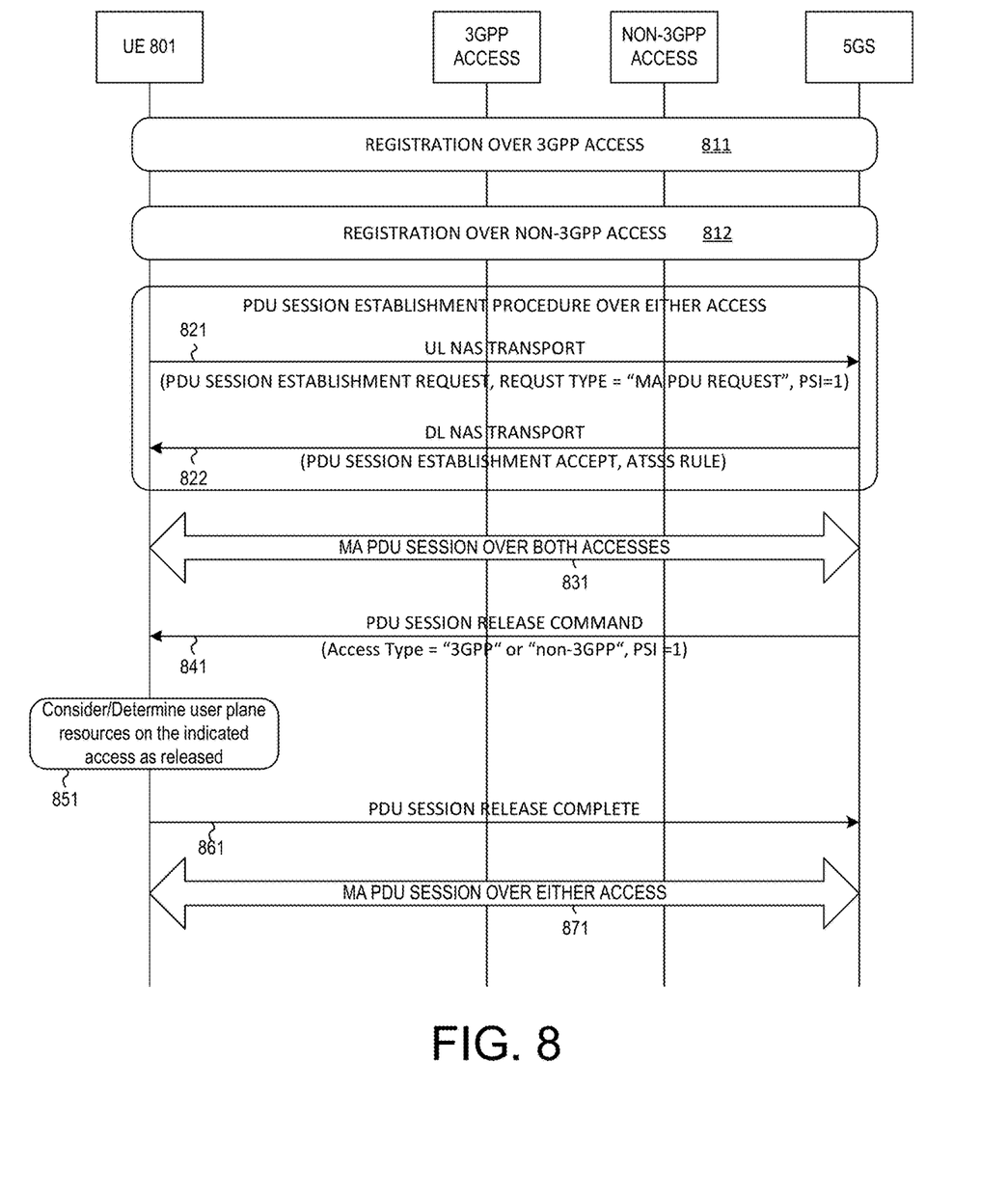
FIG. 8 illustrates a sequence flow between a UE 801 and 5GS for handling MA PDU session release when the user plane resources of the MA PDU session are established on both access types in accordance with one novel aspect.

FIG. 8 illustrates a sequence flow between a UE 801 and 5GS for handling MA PDU session release when the user plane resources of the MA PDU session are established on both access types in accordance with one novel aspect. In step 811, UE 801 registers with the 5GS network over 3GPP access type. In step 812, UE 801 registers with the 5GS network over non-3GPP access type. The registered 5GS network belong to the same PLMN. In the meantime, UE 801 may be in PDU SESSION INACTIVE state. In step 821, UE 801 initiates a PDU session establishment procedure by sending an UL NAS TRANSPORT message including a PDU SESSION ESTABLISHMENT REQUEST message over either access type, to establish an MA PDU session with a request type IE set to "MA PDU request" and with PSI=1. Upon sending the PDU SESSION ESTABLISHMENT REQUEST message, UE 801 may enter PDU SESSION ACTIVE PENDING state. In step 822, UE 801 receives a DL NAS TRANSPORT message including a PDU SESSION ESTABLISHMENT ACCEPT message from the 5GS network over a corresponding access type, which carries Access Traffic Steering Switching and Splitting (ATSSS) rule. In step 831, the MA PDU session with PSI=1 is established between UE 801 and the 5GS network over both 3GPP and non-3GPP access types, and UE 801 may enter PDU SESSION ACTIVE state. The ATSSS rules provide parameters for traffic steering, switching, and splitting functionalities between the 3GPP and non-3GPP access. Note that the establishment for an MA PDU session may require multiple steps, e.g., if the UE is registered with different PLMNs over different RATS.

In step 841, the 5GS network triggers a PDU session release procedure to release the MA PDU session over 3GPP access or non-3GPP access (e.g., MA PDU session's user plane resource on 3GPP access or non-3GPP access), by sending a PDU SESSION RELEASE COMMAND message to UE 801, with an access type IE set to "3GPP" or "non-3GPP" and with PSI=1. In step 851, UE 801 considers/determines the user plane resources on the access indicated in the access type IE as released. Specifically, the considering/determining of the user plane resources on the indicated access as released may include staying in PDU SESSION ACTIVE state, releasing the user plane resources on the indicated access, and keeping the user plane resources on the other access. In step 861, UE 801 transmits a PDU SESSION RELEASE COMPLETE message to the 5GS network. In step 871, the MA PDU session with PSI=1 becomes established over either access type.

Figure 9:
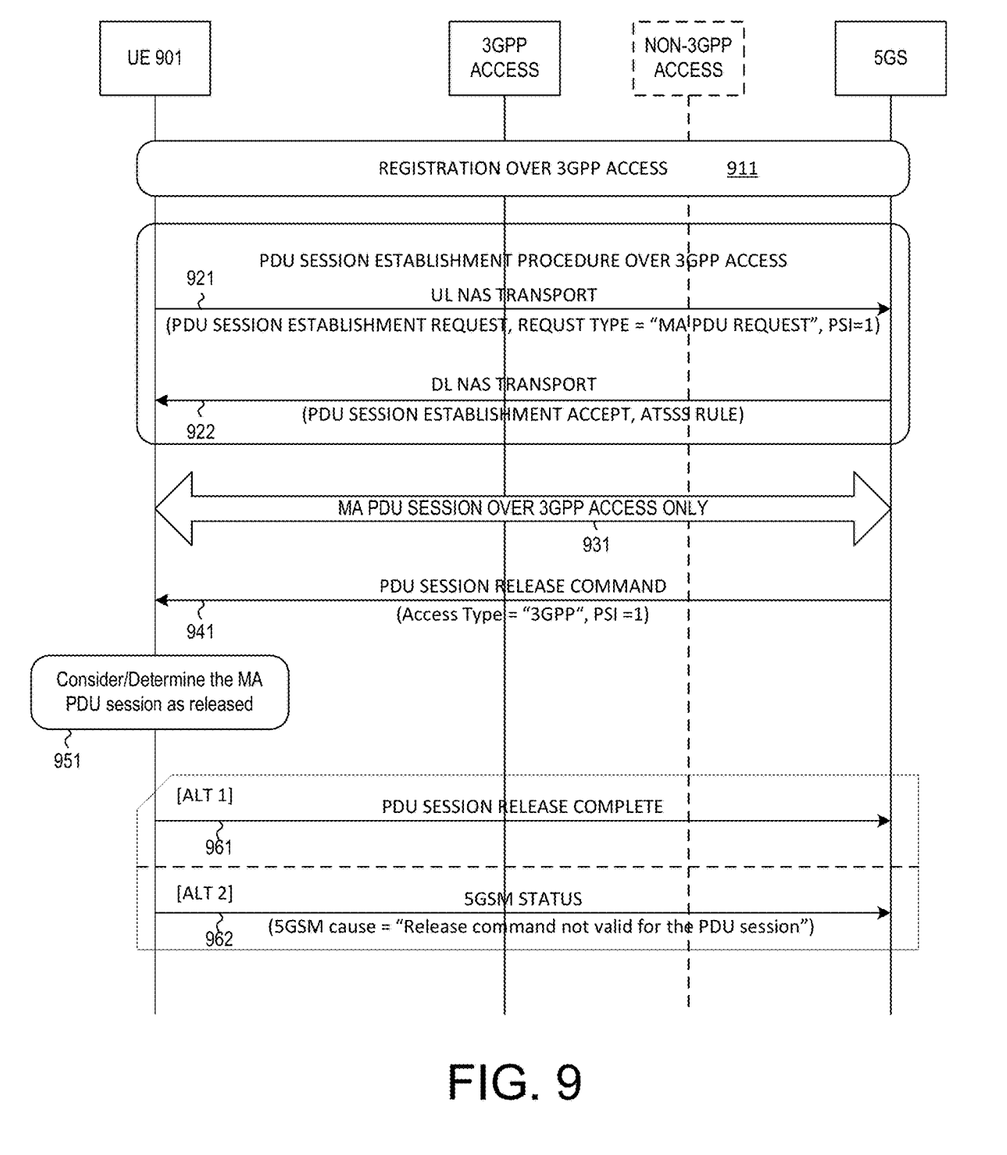
FIG. 9 illustrates a sequence flow between a UE 901 and 5GS for handling MA PDU session release when the user plane resources of the MA PDU session are established on only the access type indicated by the PDU SESSION RELEASE COMMAND message in accordance with one novel aspect.

FIG. 9 illustrates a sequence flow between a UE 901 and 5GS for handling MA PDU session release when the user plane resources of the MA PDU session are established on only the access type indicated by the PDU SESSION RELEASE COMMAND message in accordance with one novel aspect. In step 911, UE 901 registers with the 5GS network over the 3GPP access and UE 901 may be in PDU SESSION INACTIVE state. In step 921, UE 901 initiates a PDU session establishment procedure by sending an UL NAS TRANSPORT message including a PDU SESSION ESTABLISHMENT REQUEST message over the 3GPP access, to establish an MA PDU session with a request type IE set to "MA PDU request" and with PSI=1. Upon sending the PDU SESSION ESTABLISHMENT REQUEST message, UE 901 may enter PDU SESSION ACTIVE PENDING state. In step 922, UE 901 receives a DL NAS TRANSPORT message including a PDU SESSION ESTABLISHMENT ACCEPT message from the 5GS network over a corresponding access type, which carries ATSSS rule. In step 931, the MA PDU session with PSI=1 is established between UE 901 and the 5GS network over the 3GPP access only, and UE 901 may enter PDU SESSION ACTIVE state. The ATSSS rules provide parameters for traffic steering, switching, and splitting functionalities between the 3GPP and non-3GPP access.

In step 941, the 5GS network triggers a PDU session release procedure to release the MA PDU session over the 3GPP access (e.g., MA PDU session's user plane resource on 3GPP access), by sending a PDU SESSION RELEASE COMMAND message to UE 901, with an access type IE set to "3GPP" and with PSI=1. Note that, in another embodiment, the MA PDU session may be established over the other access type (e.g., non-3GPP access) and the access type IE in the PDU SESSION RELEASE COMMAND message may be set to "non-3GPP".

In step 951, UE 901 considers/determines the MA PDU session as released in response to the MA PDU session having user plane resources established on only the access type indicated in the access type IE. Specifically, the considering/determining of the MA PDU session as released may include operations, such as entering PDU SESSION INACTIVE state, releasing the MA PDU session, and deleting the PDU session contexts associated with the MA PDU session. Note that, in another embodiment, UE 901 may keep the MA PDU session as it is (i.e., UE 901 may stay in PDU SESSION ACTIVE state), instead of releasing the MA PDU session. Next, UE 901 may transmit a PDU SESSION RELEASE COMPLETE message to the 5GS network (step 961), or may transmit a 5G session management (5GSM) STATUS message to the 5GS network (step 962). Specifically, the 5GSM STATUS message includes a 5GSM cause value indicating that the PDU SESSION RELEASE COMMAND message is not valid for the MA PDU session.

Figure 10:
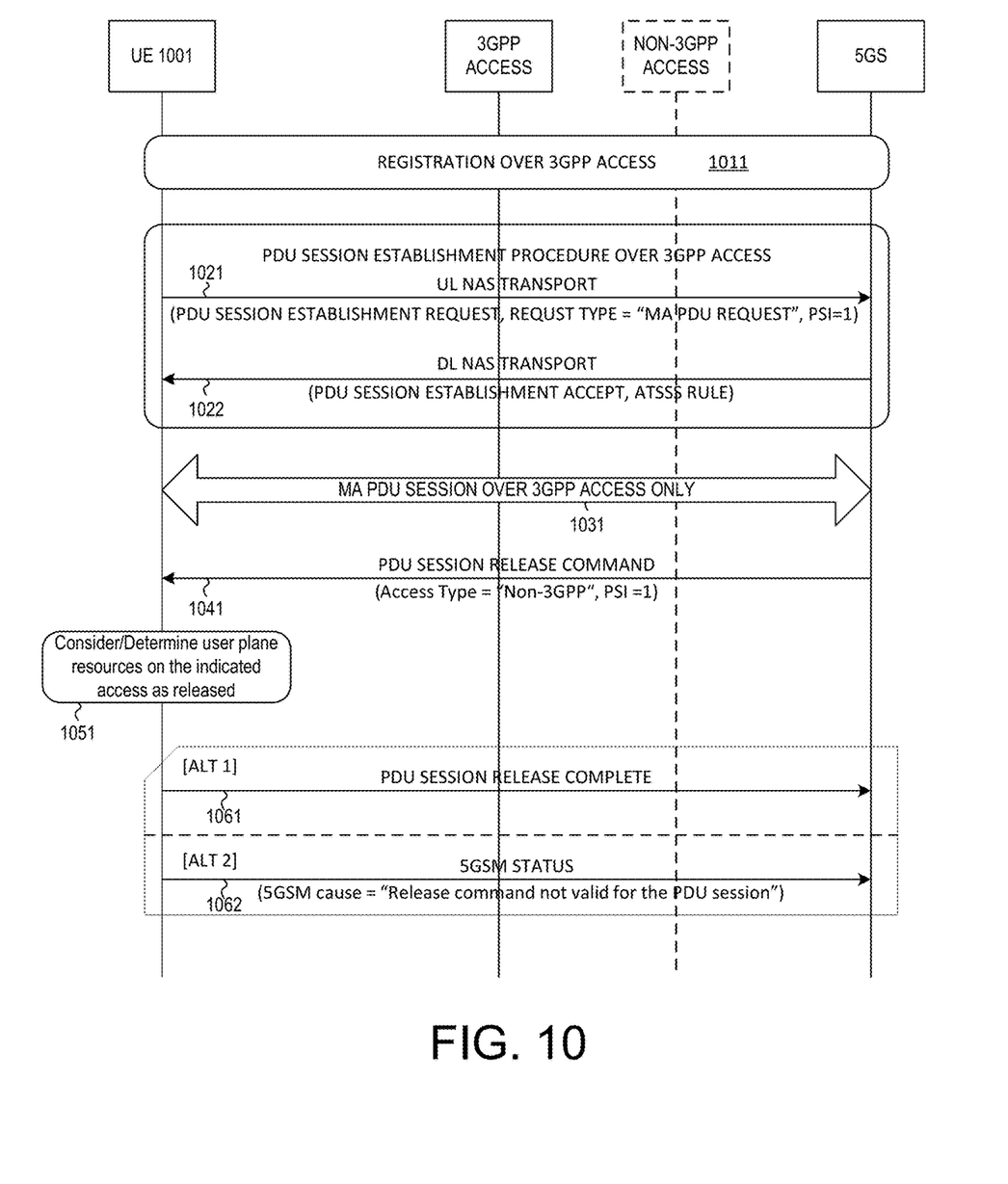
FIG. 10 illustrates a sequence flow between a UE 1001 and 5GS for handling MA PDU session release when the user plane resources of the MA PDU session are not established on the access type indicated by the PDU SESSION RELEASE COMMAND message in accordance with one novel aspect.

FIG. 10 illustrates a sequence flow between a UE 1001 and 5GS for handling MA PDU session release when the user plane resources of the MA PDU session are not established on the access type indicated by the PDU SESSION RELEASE COMMAND message in accordance with one novel aspect. In step 1011, UE 1001 registers with the 5GS network over the 3GPP access, and UE 1001 may be in PDU SESSION INACTIVE state. In step 1021, UE 1001 initiates a PDU session establishment procedure by sending an UL NAS TRANSPORT message including a PDU SESSION ESTABLISHMENT REQUEST message over the 3GPP access, to establish an MA PDU session with a request type IE set to "MA PDU request" and with PSI=1. Upon sending the PDU SESSION ESTABLISHMENT REQUEST message, UE 1001 may enter PDU SESSION ACTIVE PENDING state. In step 1022, UE 1001 receives a DL NAS TRANSPORT message including a PDU SESSION ESTABLISHMENT ACCEPT message from the 5GS network over a corresponding access type, which carries ATSSS rule. In step 1031, the MA PDU session with PSI=1 is established between UE 1001 and the 5GS network over the 3GPP access only, and UE 1001 may enter PDU SESSION ACTIVE state. The ATSSS rules provide parameters for traffic steering, switching, and splitting functionalities between the 3GPP and non-3GPP access.

In step 1041, the 5GS network triggers a PDU session release procedure to release the MA PDU session over the non-3GPP access (e.g., MA PDU session's user plane resource on non-3GPP access), by sending a PDU SESSION RELEASE COMMAND message to UE 1001, with an access type IE set to "non-3GPP" and with PSI=1. Note that, in another embodiment, the MA PDU session may be established over the other access type (e.g., non-3GPP access) and the access type IE in the PDU SESSION RELEASE COMMAND message may be set to "non-3GPP".

In step 1051, UE 1001 considers/determines the user plane resources on the access indicated in the access type IE as released (i.e., keeps the MA PDU session as it is). Specifically, the considering/determining of the user plane resources on the indicated access as released may include staying in PDU SESSION ACTIVE state, and keeping the PDU session contexts associated with the MA PDU session. That is, UE 1001 does not diagnose an error for the access type IE, and may further process the release command. Note that, in another embodiment, UE 1001 may release the whole MA PDU session (i.e., UE 1001 may enter PDU SESSION INACTIVE state), instead of keeping the MA PDU session. Next, UE 1001 may transmit a PDU SESSION RELEASE COMPLETE message to the 5GS network (step 1061), or may transmit a 5GSM STATUS message to the 5GS network (step 1062). Specifically, the 5GSM STATUS message includes a 5GSM cause value indicating that the PDU SESSION RELEASE COMMAND message is not valid for the MA PDU session.

Figure 11:
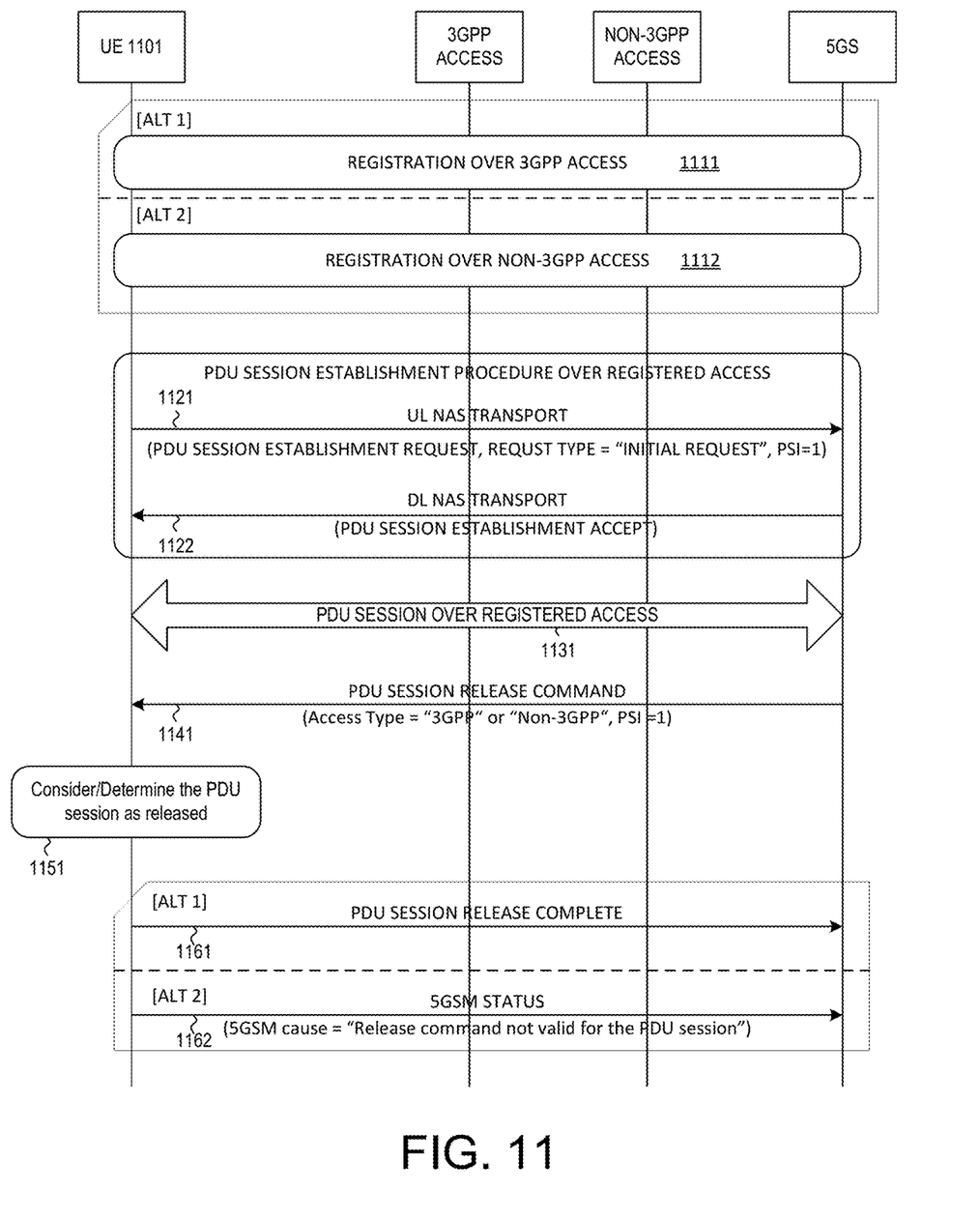
FIG. 11 illustrates a sequence flow between a UE 1101 and 5GS for handling MA PDU session release when the established PDU session is not an MA PDU session in accordance with one novel aspect.

FIG. 11 illustrates a sequence flow between a UE 1101 and 5GS for handling MA PDU session release when the established PDU session is not an MA PDU session in accordance with one novel aspect. To begin with, UE 1101 registers with the 5GS network over either the 3GPP access (step 1111) or the non-3GPP access (step 1112). In the meantime, UE 1101 may be in PDU SESSION INACTIVE state. In step 1121, UE 1101 initiates a PDU session establishment procedure by sending an UL NAS TRANSPORT message including a PDU SESSION ESTABLISHMENT REQUEST message over the registered access type, to establish a (single-access) PDU session with a request type IE set to "initial request" and with PSI=1. Upon sending the PDU SESSION ESTABLISHMENT REQUEST message, UE 1101 may enter PDU SESSION ACTIVE PENDING state. In step 1122, UE 1101 receives a DL NAS TRANSPORT message including a PDU SESSION ESTABLISHMENT ACCEPT message from the 5GS network over the registered access type. In step 1131, the PDU session with PSI=1 is established between UE 1101 and the 5GS network over the 3GPP access or the non-3GPP access, and UE 1101 may enter PDU SESSION ACTIVE state.

In step 1141, the 5GS network triggers a PDU session release procedure to release an MA PDU session over the 3GPP access or the non-3GPP access (e.g., MA PDU session's user plane resource on 3GPP or non-3GPP access), by sending a PDU SESSION RELEASE COMMAND message to UE 1101, with an access type IE set to "3GPP" or "non-3GPP" and with PSI=1. In step 1151, UE 1101 considers/determines the PDU session as released in response to the PDU session not being an MA PDU session. Specifically, the considering/determining of the PDU session as released may include operations, such as entering PDU SESSION INACTIVE state, releasing the PDU session, and deleting the PDU session contexts associated with the PDU session. Note that, in another embodiment, UE 1101 may keep the PDU session as it is (i.e., UE 1101 may stay in PDU SESSION ACTIVE state), instead of releasing the PDU session. Next, UE 1101 may transmit a PDU SESSION RELEASE COMPLETE message to the 5GS network (step 1161), or may transmit a 5GSM STATUS message to the 5GS network (step 1162). Specifically, the 5GSM STATUS message includes a 5GSM cause value indicating that the PDU SESSION RELEASE COMMAND message is not valid for the MA PDU session.

Figure 12:
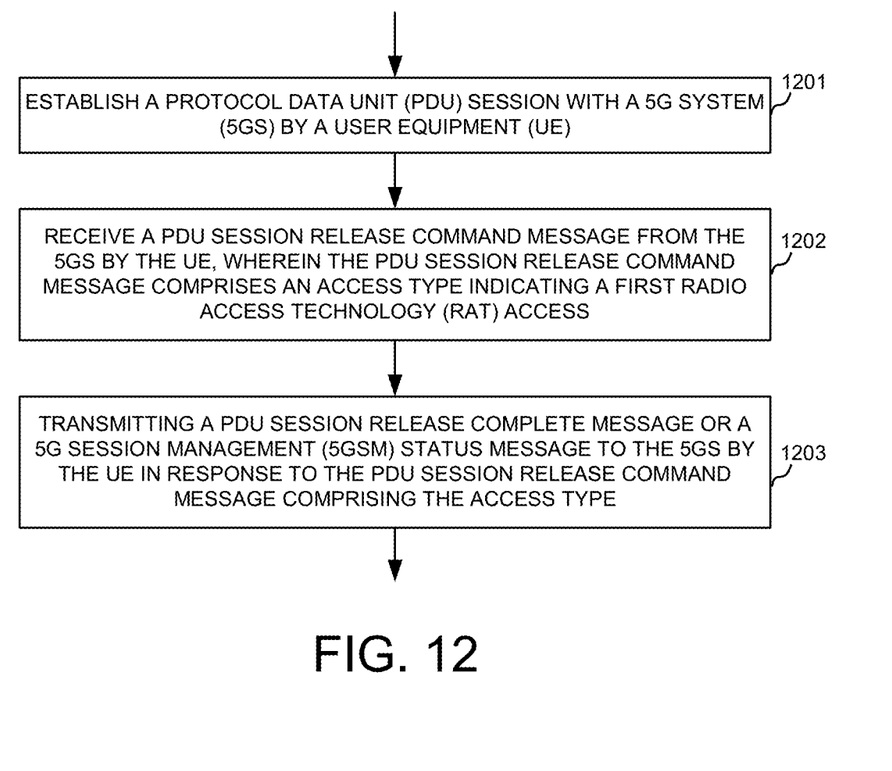
FIG. 12 is a flow chart of a method of handling MA PDU session release in accordance with one novel aspect of the present invention.

FIG. 12 is a flow chart of a method of handling MA PDU session release in accordance with one novel aspect of the present invention. In step 1201, a UE establishes a PDU session with a 5GS. In step 1202, the UE receives a PDU session release command message from the 5GS, wherein the PDU session release command message includes an access type indicating a first RAT access. In step 1203, the UE transmits a PDU session release complete message or a 5GSM status message to the 5GS in response to the PDU session release command message including the access type. In one example, the PDU session is an MA PDU session, and the UE further considers/determines the MA PDU session as released in response to the MA PDU session having user plane resources established on only the first RAT access indicated in the access type. In another example, the PDU session is an MA PDU session, and the UE further considers/determines the user plane resources of the MA PDU session on the first RAT access indicated in the access type as released in response to the MA PDU session having user plane resources established on only a second RAT access different from the first RAT access indicated in the access type or on both the first RAT access and the second RAT access. In another example, the PDU session is not an MA PDU session, and the UE further considers/determines the PDU session as released or keeps the PDU session as it.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a protocol data unit (PDU) session with a 5G system (5GS) by a user equipment (UE);
   receiving a PDU session release command message from the 5GS by the UE, wherein the PDU session release command message comprises an access type indicating a first radio access technology (RAT) access; and
   determining, by the UE, whether the PDU session is a multi-access (MA) PDU session and whether the MA PDU session having user plane resources established on only the first RAT access indicated in the access type or the MA PDU session having the user plane resources established on only a second RAT access different from the first RAT access indicated in the access type; and
   transmitting a PDU session release complete message or a 5G session management (5GSM) status message to the 5GS by the UE in response to the PDU session release command message comprising the access type.

2. The method of claim 1, wherein the PDU session is the MA PDU session, and the method further comprises:
   determining the MA PDU session as released in response to the MA PDU session having the user plane resources established on only the first RAT access indicated in the access type.

3. The method of claim 2, wherein the determining of the MA PDU session as released comprises:
   releasing the MA PDU session; and
   deleting PDU session contexts associated with the MA PDU session.

4. The method of claim 1, wherein the PDU session is the MA PDU session, and the method further comprises:
   determining the user plane resources of the MA PDU session on the first RAT access indicated in the access type as released in response to the MA PDU session having the user plane resources established on only a second RAT access different from the first RAT access indicated in the access type or on both the first RAT access and the second RAT access.

5. The method of claim 4, wherein the determining of the user plane resources of the MA PDU session on the first RAT access as released comprises:
   keeping PDU session contexts associated with the MA PDU session.

6. The method of claim 5, wherein the determining of the user plane resources of the MA PDU session on the first RAT access as released comprises:
   releasing the user plane resources of the MA PDU session on the first RAT access in response to the MA PDU session having user plane resources established on both the first RAT access and the second RAT access.

7. The method of claim 1, wherein the first RAT access is one of a 3rd generation partner project (3GPP) access and a non-3GPP access.

8. The method of claim 1, wherein the 5GSM status message comprises a cause value indicating that the PDU session release command message is not valid for the PDU session.

9. The method of claim 1, further comprising:
   keeping the PDU session as it is by the UE.

10. The method of claim 1, wherein the PDU session is not the MA PDU session, and the method further comprising:
    releasing the PDU session by the UE.

11. A User Equipment (UE), comprising:
    a Protocol data unit (PDU) session handling circuit that establishes a PDU session with a 5G system (5GS); and
    a receiver that receives a PDU session release command message from the 5GS, wherein the PDU session release command message comprises an access type indicating a first radio access technology (RAT) access;
a processor that determines whether the PDU session is a multi-access (MA) PDU session and whether the MA PDU session having user plane resources established on only the first RAT access indicated in the access type or the MA PDU session having the user plane resources established on only a second RAT access different from the first RAT access indicated in the access type; and
a transmitter that transmits a PDU session release complete message or a 5G session management (5GSM) status message to the 5GS in response to the PDU session release command message comprising the access type.

12. The UE of claim 11, wherein the PDU session is the MA PDU session, and the UE determines the MA PDU session as released in response to the MA PDU session having user plane resources established on only the first RAT access indicated in the access type.

13. The UE of claim 12, wherein, in determining the MA PDU session as released, the UE releases the MA PDU session and deletes PDU session contexts associated with the MA PDU session.

14. The UE of claim 11, wherein the PDU session is the MA PDU session, and the UE determines user plane resources of the MA PDU session on the first RAT access indicated in the access type as released in response to the MA PDU session having user plane resources established on only a second RAT access different from the first RAT access indicated in the access type or on both the first RAT access and the second RAT access.

15. The UE of claim 14, wherein, in determining the user plane resources of the MA PDU session on the first RAT access as released, the UE keeps PDU session contexts associated with the MA PDU session.

16. The UE of claim 15, wherein, in determining the user plane resources of the MA PDU session on the first RAT access as released, the UE releases the user plane resources of the MA PDU session on the first RAT access in response to the MA PDU session having user plane resources established on both the first RAT access and the second RAT access.

17. The UE of claim 11, wherein the first RAT access is one of a 3rd generation partner project (3GPP) access and a non-3GPP access.

18. The UE of claim 11, wherein the 5GSM status message comprises a cause value indicating that the PDU session release command message is not valid for the PDU session.

19. The UE of claim 11, wherein the UE keeps the PDU session as it is.

20. The UE of claim 11, wherein the PDU session is not the MA PDU session, and the UE releases the PDU session.

* * * * *